(12) United States Patent
Perrett

(10) Patent No.: US 10,690,491 B1
(45) Date of Patent: Jun. 23, 2020

(54) STANDOFF FIXTURE FOR LASER INSPECTION

(71) Applicant: UNITED TECHNOLOGIES CORPORATION, Farmington, CT (US)

(72) Inventor: Gordon A. Perrett, Andover, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/366,513

(22) Filed: Mar. 27, 2019

(51) Int. Cl.
*G01B 11/26* (2006.01)
*B33Y 50/00* (2015.01)
*B33Y 80/00* (2015.01)

(52) U.S. Cl.
CPC .............. *G01B 11/26* (2013.01); *B33Y 50/00* (2014.12); *B33Y 80/00* (2014.12)

(58) Field of Classification Search
CPC .......... G01B 11/26; B33Y 50/00; B33Y 80/00
USPC ................................................. 356/244, 138
See application file for complete search history.

(56) References Cited

U.S. PATENT DOCUMENTS

| | | | |
|---|---|---|---|
| 5,999,265 A | 12/1999 | Dalancon et al. | |
| 7,542,135 B2* | 6/2009 | Mead ..................... | G01B 11/14 356/237.6 |
| 9,013,716 B2* | 4/2015 | Monks ................... | G01B 11/25 356/600 |
| 2004/0004718 A1* | 1/2004 | Griffus ..................... | G01J 3/02 356/402 |
| 2006/0132761 A1* | 6/2006 | Hall ........................ | G01M 11/02 356/244 |
| 2008/0024774 A1* | 1/2008 | Tsai ...................... | G01N 21/256 356/244 |
| 2010/0162566 A1* | 7/2010 | Mercier .................. | G01M 9/08 29/889.6 |
| 2011/0090513 A1* | 4/2011 | Seidl ....................... | A61C 9/00 356/601 |
| 2012/0017842 A1* | 1/2012 | Yamada ................. | G01N 21/01 119/421 |
| 2013/0021604 A1* | 1/2013 | Sun ....................... | G01N 21/211 356/244 |
| 2017/0003393 A1 | 1/2017 | Monks | |

* cited by examiner

*Primary Examiner* — Roy M Punnoose
(74) *Attorney, Agent, or Firm* — Snell & Wilmer L.L.P.

(57) ABSTRACT

A method of inspecting a part includes manufacturing a standoff fixture specific to the part, coupling the standoff fixture to a laser measurement device, engaging the standoff fixture with the part, and actuating the laser measurement device to detect a geometric specification of a feature of the part, according to various embodiments. The standoff fixture may include an attachment portion configured to be coupled to the laser measurement device and a plurality of legs extending from the attachment portion.

17 Claims, 9 Drawing Sheets

STANDOFF FIXTURE FOR LASER INSPECTION

FIELD

The present disclosure relates to inspection devices, methods, and systems, and more specifically to custom standoff fixtures for laser measurement devices, methods, and systems.

BACKGROUND

Certain parts, such as rotor elements of a gas turbine engine, are often inspected to ensure that such parts are sized correctly or otherwise have desired geometric specifications. For example, conventional inspection methods generally involve creating a mold of the part and/or utilizing shadowgraph procedures to detect if features of the part are improperly sized/oriented or if the features of the part otherwise have an incorrect geometry. Such conventional inspection methods are often time-consuming and labor intensive. Although hand-held laser measurement devices may decrease overall time required for inspection, inspection results and inspection data from conventional hand-held laser measurement devices may suffer from inaccuracies due to varying users, inconsistencies of orientation/handling of the laser measurement device, and general lack of reproducibility.

SUMMARY

In various embodiments, the present disclosure provides a method of inspecting a part. The method includes manufacturing a standoff fixture specific to the part, coupling the standoff fixture to a laser measurement device, engaging the standoff fixture with the part, and actuating the laser measurement device to detect a geometric specification of a feature of the part, according to various embodiments. The step of manufacturing the standoff fixture may include manufacturing the standoff fixture specific to the feature of the part.

In various embodiments, the standoff fixture comprises a plurality of legs, manufacturing the standoff fixture comprises manufacturing the plurality of legs of the standoff fixture specific to the feature of the part. In various embodiments, engaging the standoff fixture with the part comprises engaging the plurality of legs against the part. In various embodiments, manufacturing the standoff fixture comprises using an additive manufacturing process.

In various embodiments, the part is a rotor disk of a gas turbine engine, and engaging the plurality of legs against the part comprises engaging a first leg of the plurality of legs against a web of the rotor disk. Further, engaging the plurality of legs against the part may include engaging a second leg of the plurality of legs against a flange of the rotor disk. In various embodiments, feature of the part to be inspected is a chamfer of the flange of the rotor disk, and the geometric specification may be an angle and/or a dimension of the chamfer. In various embodiments, the standoff fixture includes three legs such that engaging the standoff fixture with the part comprises engaging the three legs against the part. The geometric specification may include at least one of a radius, a mismatch, a chamfer angle, and a chamfer height.

Also disclosed herein, according to various embodiments, is a standoff fixture for a laser measurement device. The standoff fixture includes an attachment portion configured to be coupled to the laser measurement device and a plurality of legs extending from the attachment portion, in accordance with various embodiments. The plurality of legs may be configured to engage with a part to be inspected, and the plurality of legs may be specific to the part to be inspected.

In various embodiments, each leg of the plurality of legs is oriented specific to the part to be inspected. For example, the plurality of legs may comprise, respectively, a plurality of contact surfaces, with an orientation of each contact surface of the plurality of contact surfaces being specific to the part be inspected. In various embodiments, the standoff fixture comprises a planar surface extending from the attachment portion to at least one leg of the plurality of legs such that the planar surface forms a portion of the attachment portion and a portion of the first leg. The planar surface may extend to a second leg of the plurality of legs such that the planar surface forms a portion of the second leg. The third leg may be oriented oblique to the planar surface.

Also disclosed herein, according to various embodiments, is an inspection assembly for inspecting a part. The inspection assembly may include a laser measurement device and a standoff fixture. The standoff fixture may be detachably coupleable to the laser measurement device.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
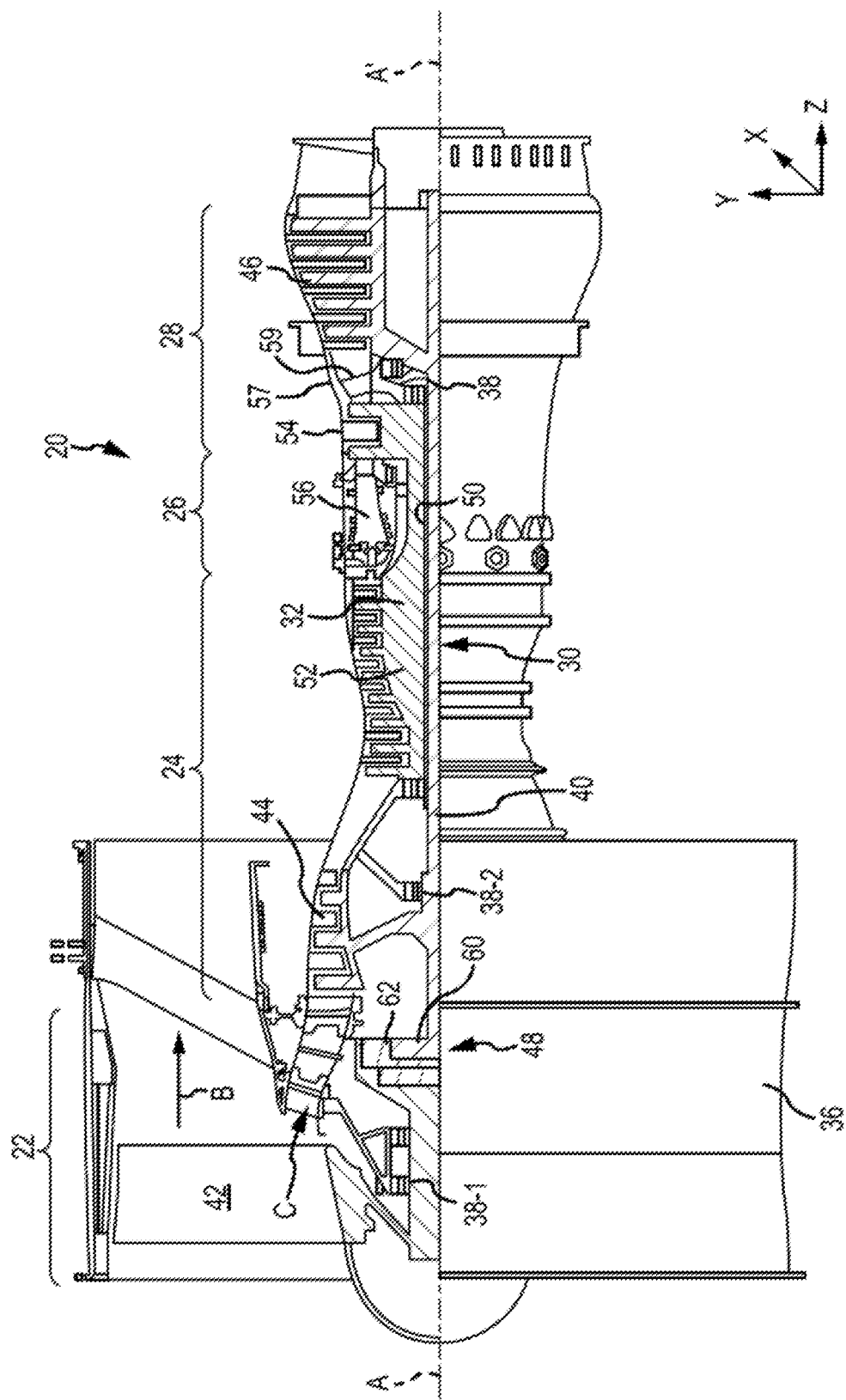
FIG. 1 is a cross-sectional view of an exemplary gas turbine engine, in accordance with various embodiments.

The subject matter of the present disclosure is particularly pointed out and distinctly claimed in the concluding end portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are methods, devices, assemblies, and systems for inspecting a part. More specifically, the present provides for standoff fixtures that are customized for a specific part (or at least a specific type of part) and that are configured to be coupled to a laser measurement device to facilitate accuracy, repeatability, and reproducibility of inspection procedures, according to various embodiments. While numerous details are included herein pertaining to standoff fixture that are used for inspecting components of a gas turbine engine (such as rotor disks), the standoff fixtures and the associated methods/systems may be used to inspect other components/parts.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to a radial direction, and the x direction on the provided xyz axis refers to a circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
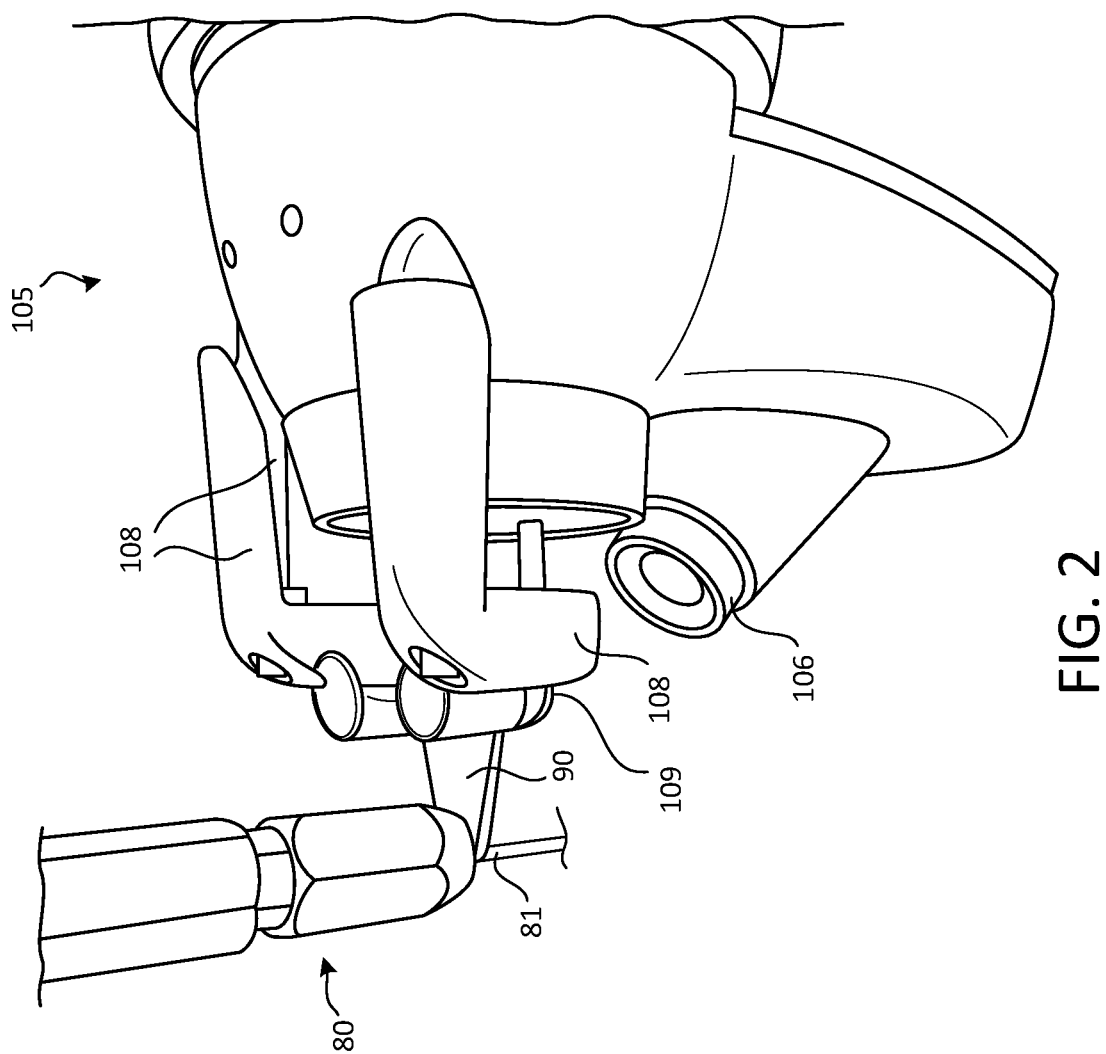
FIG. 2 is a perspective view of a laser measurement device, in accordance with various embodiments.

In various embodiments, and with reference to FIG. 2, a laser measurement device 105 is provided. The laser measurement device 105 includes one or more emitters, such as emitter 106, and one or more sensors, and the emitter(s) and sensors are generally configured to measure a geometric specification of a part, such as generic part 80, according to various embodiments. For example, a laser signal may be emitted from the emitter 106 toward the part be measured, and the sensor(s) of the laser measurement device 105 may detect geometric specification data in response to the emitted laser. Conventional laser measurement devices typically include a spacer 90 configured to be positioned between the laser measurement device and the part(s) 80 to be inspected. Generally, the spacer 90 helps to locate the part 80 a proper distance away from the one or more emitters and sensors so the appropriate/desired feature 81 of the part 80 is properly positioned in the field-of-view of the laser measurement device 105. However, as mentioned above, spacer 90 may not sufficiently restrain the laser measurement device 105 relative to the part 80, and thus the orientation, tilt, and/or rotation of the laser measurement device 105 relative to the part 80 can vary from one user to another or from one inspection to another. These variations decrease the repeatability and reproducibility of inspections, and thus adversely affect the accuracy of the inspection data.

Figure 9:
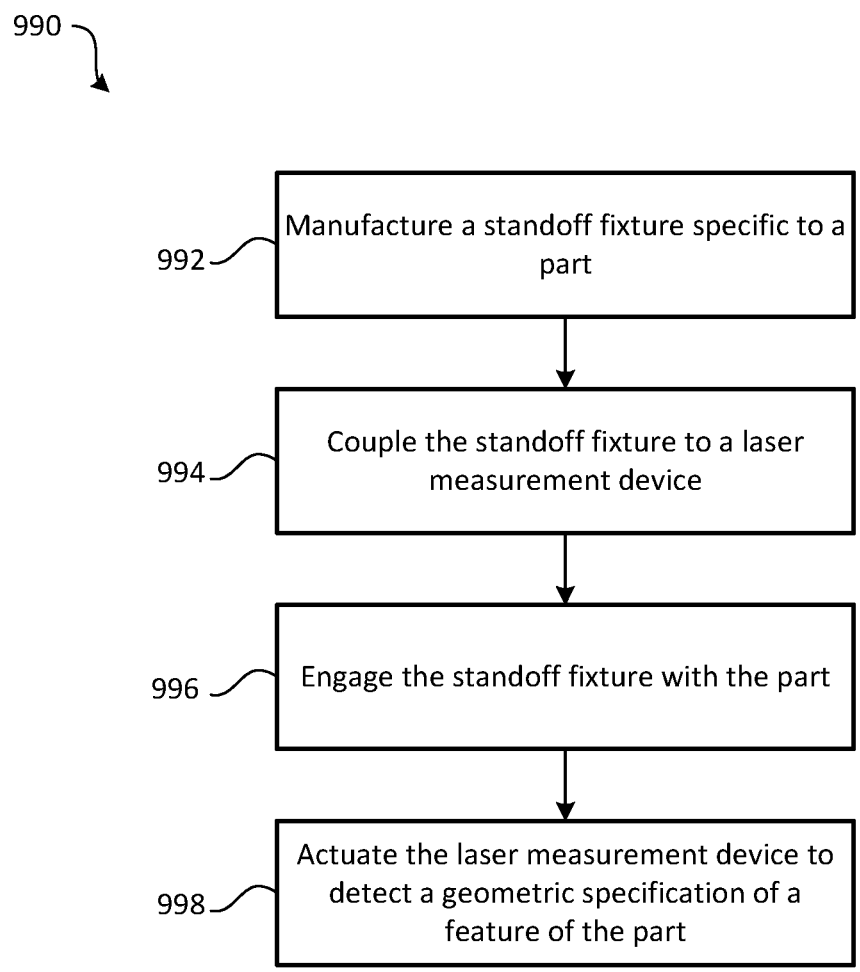
FIG. 9 is a schematic block diagram of a method of inspecting a part, in accordance with various embodiments.

In various embodiments, and with reference to FIG. 9, the present disclosure provides a method 990 of inspecting a part that overcomes the aforementioned shortcomings. The method 990 generally includes manufacturing a standoff fixture that is specific to the part at step 992, according to various embodiments. That is, instead of using a generic spacer, such as spacer 90, step 992 of the method 990 may include fabricating a custom standoff fixture to be coupled to a laser measurement device and positioned between the laser measurement device and the part to be inspected. Generally, the standoff fixture increases the repeatability, reproducibility, and overall accuracy of the inspection method 990, according to various embodiments.

At step 992 the standoff fixture may be specifically designed and manufactured for use with a specific part, or a specific type of part. For example, and as described in greater detail below, the part may be a component of a gas turbine engine 20 (FIG. 1), such as a rotor disk, and step 992 of the method 990 may include designing a standoff fixture having a plurality of legs that are precisely seated/engaged against the part. The customized standoff fixture may be utilized to facilitate inspection of multiple instances of the same part. In various embodiments, future inspections of the part, or future inspections of similar/comparable parts, are performed with the laser measurement device uniformly and consistently aligned and positioned relative to the part. Additional details pertaining to customized standoff fixtures are included below.

In various embodiments, the method 990 further includes coupling the standoff fixture to a laser measurement device at step 994, engaging the standoff fixture with the part to be inspected at step 996, and actuating the laser measurement device to detect a geometric specification of a feature of the part at step 998. In various embodiments, step 998 includes measuring more than one geometric specification of one or more features of the part. Further, step 996 may include engaging the standoff fixture to more than one part (e.g., separable parts) and step 998 may correspondingly include detecting geometric specification(s) of a plurality of parts.

In various embodiments, and with continued reference to FIG. 9, step 992 of the method 990 may include determining/identifying a specific feature of a part to be inspected and subsequently designing and manufacturing the standoff fixture in such a manner so that during step 996 of the method 990 the standoff fixture is seated in proximity to the feature/region of the part being inspected. Accordingly, step 992 may include manufacturing the standoff fixture to be specific to a feature of the part, and/or specific to a unique geometric specification of the feature of the part. In various embodiments, step 992 includes utilizing an additive manufacturing process to fabricate the standoff fixture.

In various embodiments, the standoff fixture includes a plurality of legs, as described in greater detail below. Step 992 may include specifically customized the shape, orientation, and/or extension direction of the legs based on the part and the feature of the part to be inspected. In various embodiments, step 996 may include engaging the plurality of legs so that contact surfaces of the legs are properly seated against the part to thereby properly position the laser measurement device relative to the part. For example, the standoff fixture may be manufactured at step 992 to have three legs (e.g., three points/locations of contact with the part), and thus the standoff fixture may benefit from tripod-like stability. In various embodiments, step 996 includes continuing to force the standoff fixture toward the part during step 998 to ensure the standoff fixture remains properly seated/engaged against the part.

Figure 3:
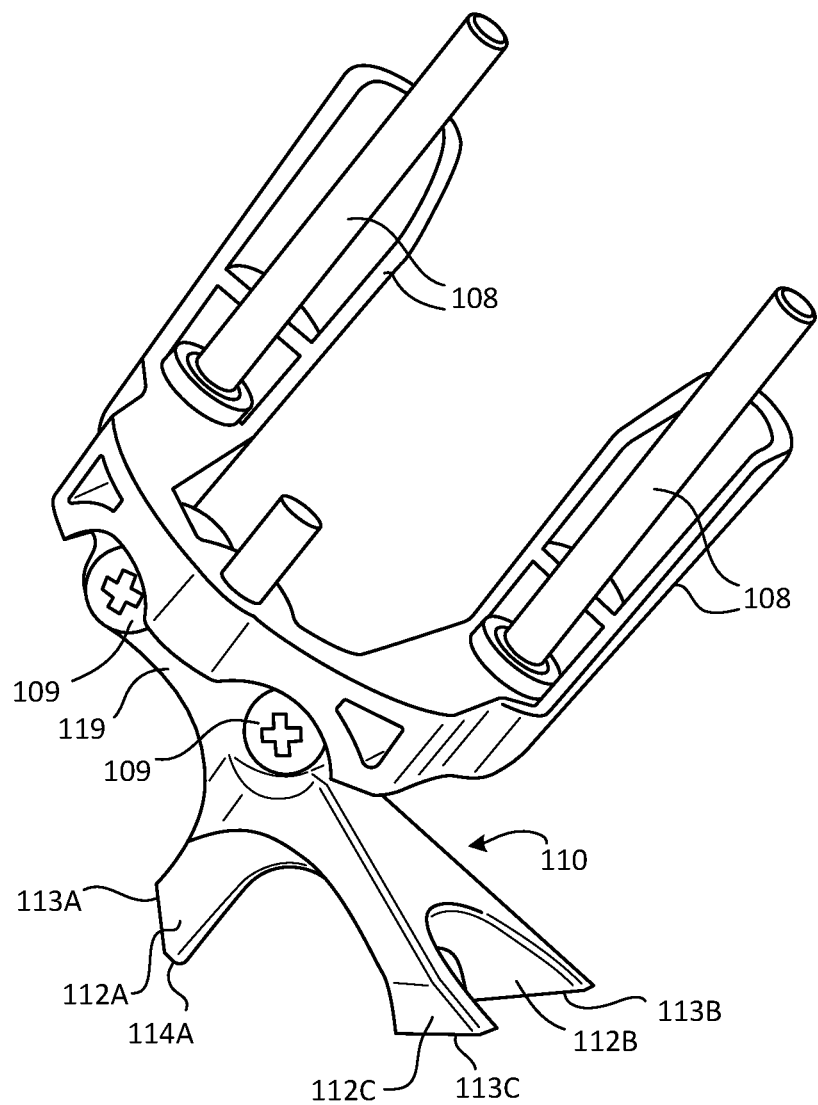
FIG. 3 is a perspective view of a standoff fixture coupled to a mounting interface of a laser measurement device, in accordance with various embodiments.

In various embodiments, and with reference to FIGS. 2 and 3, a standoff fixture 110 configured to be coupled to the laser measurement device 105 is provided. In FIG. 3, the laser measurement device 105 is not shown in order to avoid obscuring the clear depiction of the standoff fixture 110. However, mounting features 108 of the laser measurement device 105 are shown in FIG. 3 to show how the standoff fixture 110 may be coupled to and oriented relative to the laser measurement device 105. That is, the standoff fixture 110 may include an attachment portion 119 configured to be coupled to mounting features 108 of the laser measurement device 105 using fasteners 109 or other attachment mechanisms.

The standoff fixture 110, according to various embodiments, includes a plurality of legs, such as legs 112A, 112B, 112C. The plurality of legs 112A, 112B, 112C may be generally configured to engage with (e.g., be seated against) a part to be inspected. In various embodiments, and as mentioned above, the plurality of legs 112A, 112B, 112C may be specific to the part, and/or the feature of the part, being inspected. For example, the standoff fixture 110 may include a first leg 112A having one or more contact surfaces 113A, 114A, a second leg 112B having one or more contact surfaces 113B, and a third leg 112C having one or more contact surfaces 113C.

Figure 4:
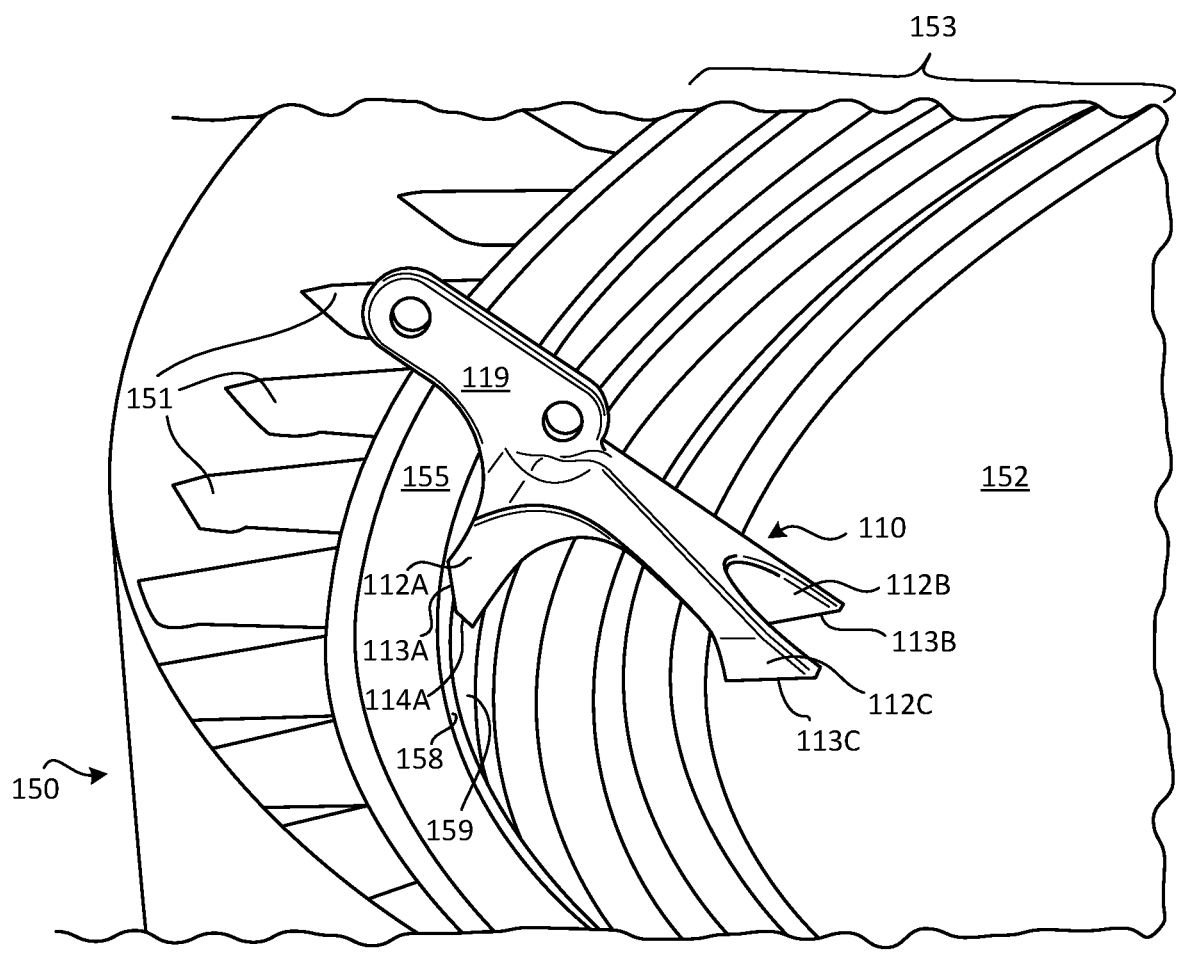
FIG. 4 is a perspective view of a standoff fixture engaged with a rotor disk, in accordance with various embodiments.
Figure 5:
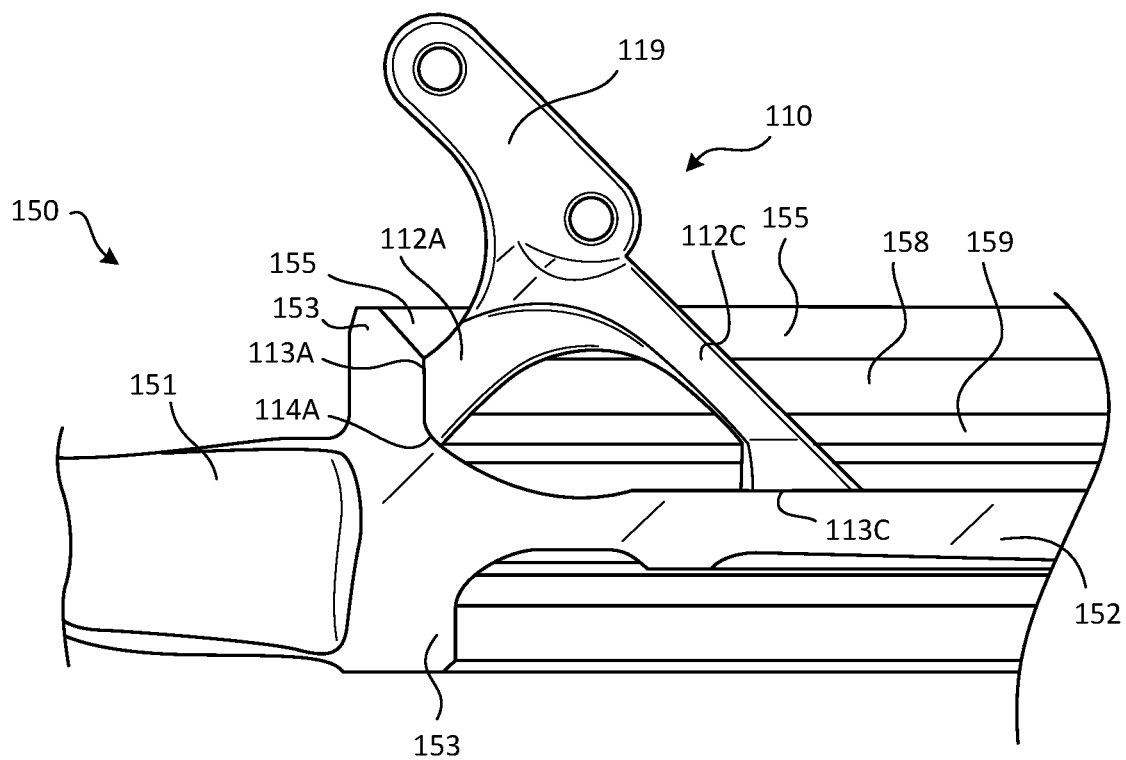
FIG. 5 is a plan view of a standoff fixture engaged with a rotor disk, in accordance with various embodiments.

In various embodiments, and with reference to FIGS. 4 and 5, the standoff fixture 110 is provided being positioned against a part to be inspected. During use (e.g., in practicing the method 990), the standoff fixture 110 would be coupled/mounted to the laser measurement device 105 (FIG. 2), and then the standoff fixture would be engaged against the part in the orientation shown in FIGS. 4 and 5, according to various embodiments. However, in order to avoid obscuring a clear depiction of the features of the standoff fixture 110 and the part against which it is engaged, the laser measurement device 105 (FIG. 2) is intentionally omitted from FIGS. 4 and 5.

In various embodiments, the part to be inspected may be a rotor disk 150 of the gas turbine engine 20, and thus the standoff fixture 110 may be configured and specifically designed/manufactured to engage the rotor disk 150. In various embodiments, because of the high rotational velocities of the rotor disks of a gas turbine engine, it may be important to ensure that rotor disks of a gas turbine engine are precisely manufactured in order to prevent damage to the blades 151 and/or other components of the gas turbine engine during operation. In various embodiments, the plurality of legs 112A, 112B, 112C are specifically manufactured to conformingly engage regions of the rotor disk 150 in order to enable the laser measurement device 105 (FIG. 2) to be actuated to determine/detect a geometric specification of a specific feature/region of the rotor disk 150. For example, the second leg 112B and the third leg 112C of the standoff fixture 110 may be configured to engage a web 152 of the rotor disk 150, and the first leg 112A may be configured to engage a flange 153 of the rotor disk 150. More specifically, the second and third legs 112B, 112C may respectively comprise contact surfaces 113B, 113C that are parallel with and conform to a surface of the web 152 of the rotor disk 150 while the first leg 112A may comprise two contact surfaces 113A, 114A that contour/conform respective surfaces 158, 159 of the flange 153 of the rotor disk 150.

In various embodiments, the feature being inspected is a chamfer 155 of the flange 153 of the rotor disk 150. For example, the laser measurement device 105 (FIG. 2), being properly positioned relative to the rotor disk 150 via the standoff fixture 110, may be configured to detect/determine an angle or a height of the chamfer 155. That is, the geometric specification may be an angle or dimension (e.g., height) of a chamfer. In various embodiments, the standoff fixture 110 may be used to determine other geometric specifications, such as a radius of a feature.

Figure 6A:
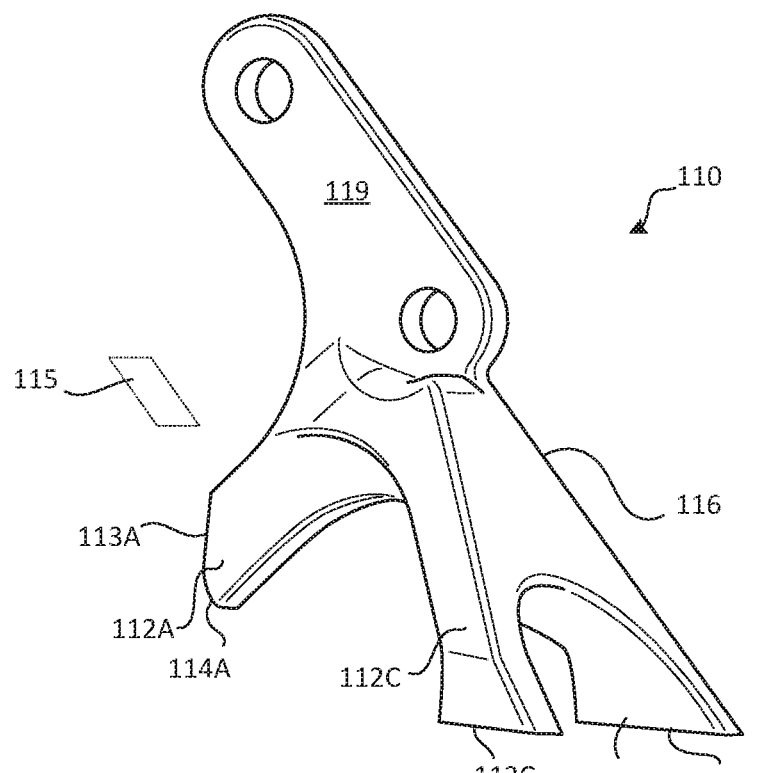
FIG. 6A is a perspective view of a standoff fixture, in accordance with various embodiments.
Figure 6B:
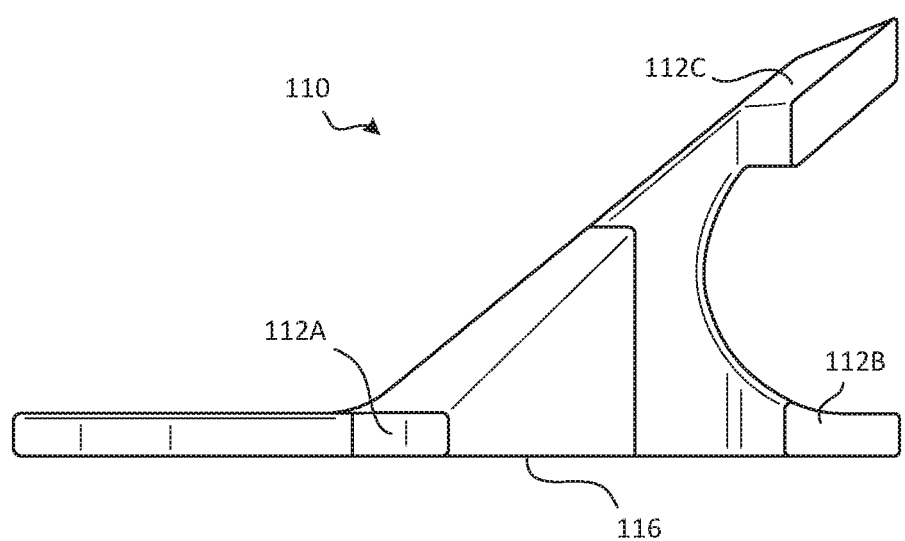
FIG. 6B is a plan view of a standoff fixture, in accordance with various embodiments.

In various embodiments, and with reference to FIGS. 6A and 6B, the standoff fixture 110 includes a planar surface 116 that extends across/along the attachment portion 119 and at least one leg of the plurality of legs 112A, 112B, 112C. That is, the planar surface 116 may be defined by, and thus may form a side of, the attachment portion 119 and one of the legs of the plurality of legs. For example, the planar surface 116 may extend/continue from the attachment portion 119 to a side of the first leg 112A. The planar surface 116 may further extend/continue to form a side of the second leg 112B as well. In various embodiments, the third leg 112C may be oriented oblique to the planar surface 116. In various embodiments, no portion of the standoff fixture 110 extends beyond the planar surface, thereby preventing any portion of the standoff fixture 110 extending in to the field-of-view 115 of the laser measurement device 105 (FIG. 2).

Figure 7:
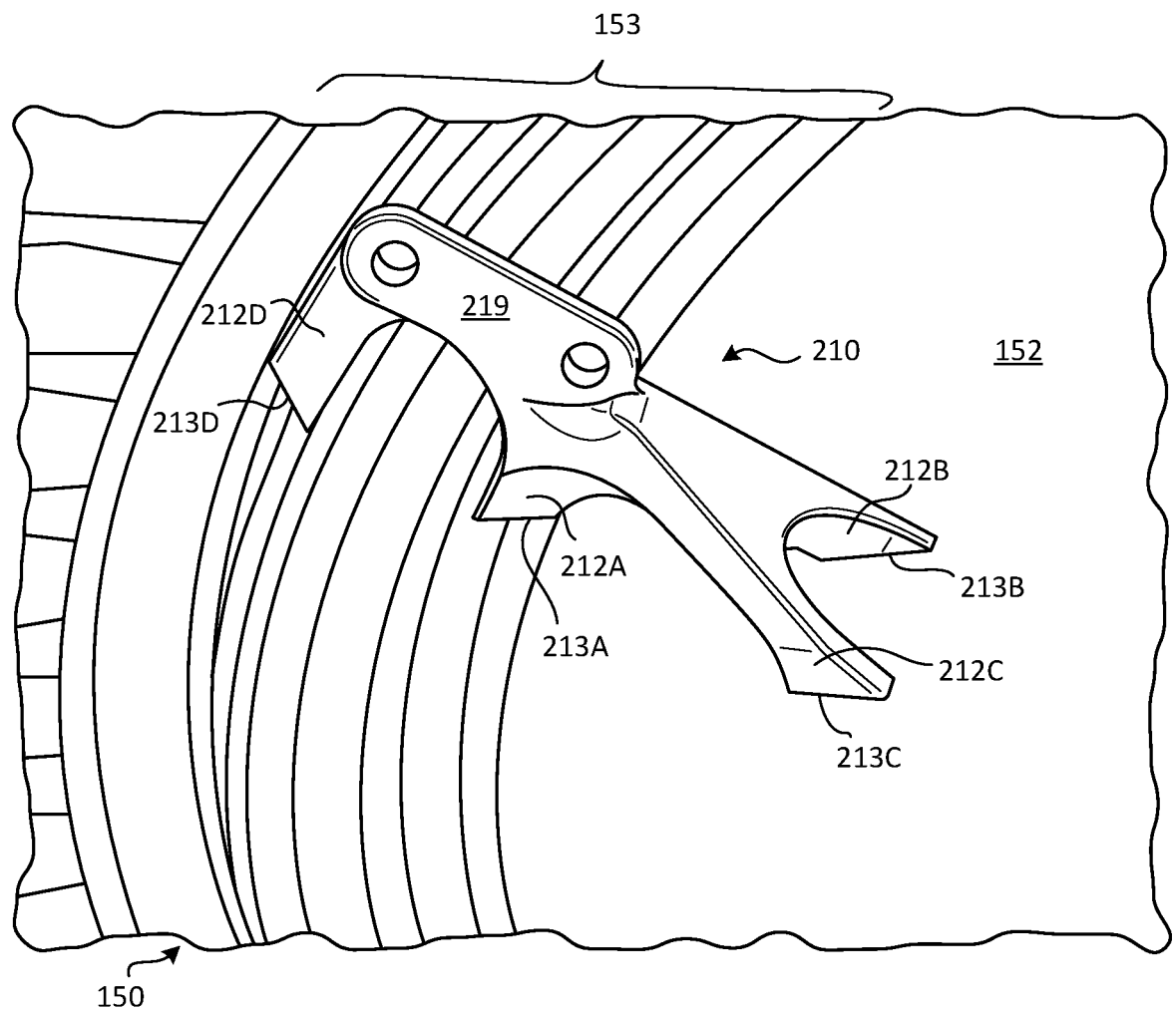
FIG. 7 is a perspective view of a standoff fixture engaged with a rotor disk, in accordance with various embodiments.

In various embodiments, and with reference to FIG. 7, the standoff fixture 210 may be configured to engage the rotor disk 150 to facilitate measurement of a radius of the rotor disk (e.g., a radius of a section of the flange 153 of the rotor disk 150). In various embodiments, the standoff fixture 210 includes an attachment portion 219, with three legs 212A, 212B, 212C extending from a first side of the attachment portion 219 and a fourth leg 212D extending from a second side of the attachment portion 219. Each of the legs 212A, 212B, 212C, 212D may include one or more contact surfaces 213A, 213B, 213C, 213D for engaging and conforming with respective surfaces/regions of the rotor disk 150. In various embodiments, the radius to be measured is generally between the first leg 212A and the fourth leg 212D.

Figure 8:
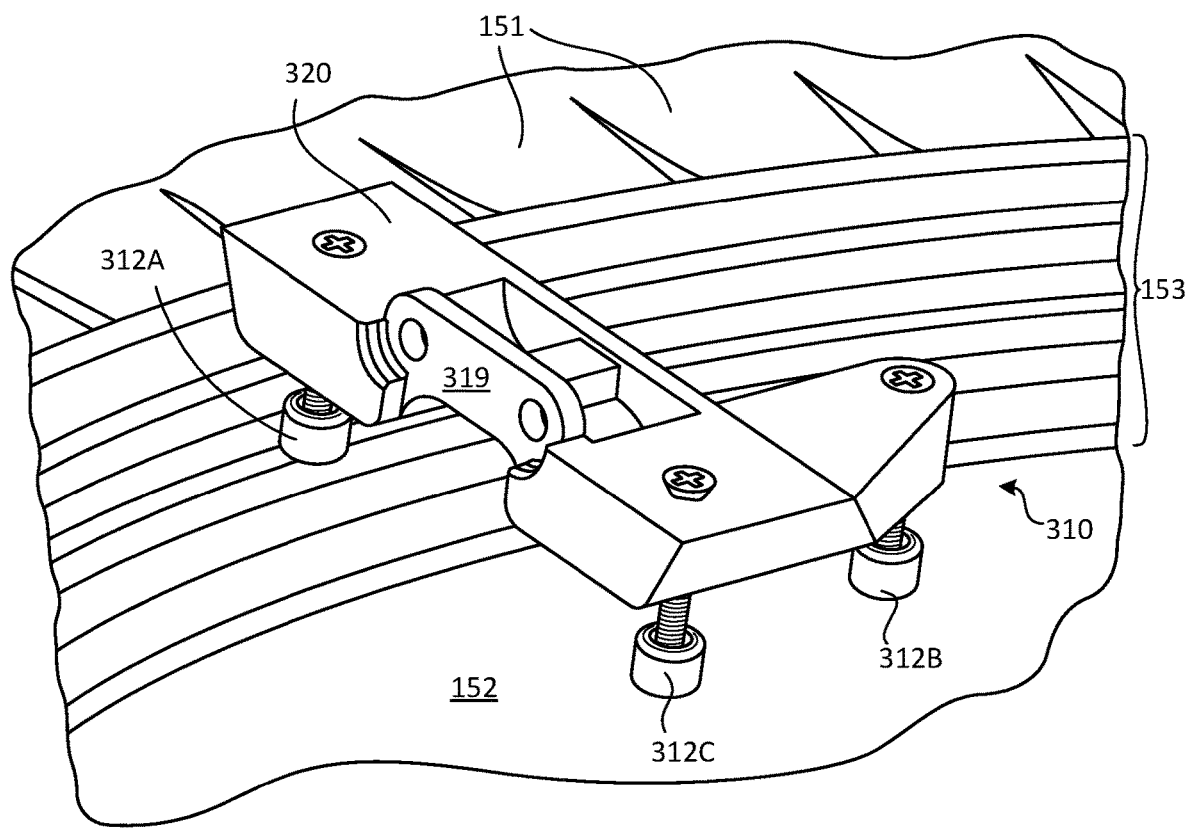
FIG. 8 is a perspective view of a standoff fixture having a plurality of legs with dimensions that can be varied, in accordance with various embodiments.

In various embodiments, and with reference to FIG. 8, the standoff fixture 310 may include a plurality of legs 312A, 312B, 312C having adjustable/customizable dimensions. That is, the length of the legs 312A, 312B, 312C of the standoff fixture 310 may be varied based on the specific feature to be inspected or based on the specific geometric specification to be determined. In various embodiments, for example, the attachment portion 319 may be a portion of a body 320 of the standoff fixture 310, and the legs 312A, 312B, 312C may be threadably engaged with the body 320 of the standoff fixture 310 to allow the distance of their respective heads from the body 320 to be respectively adjusted based on the shape of the part being inspected. In various embodiments, the standoff fixture 310 may be utilized to detect/determine the presence and/or magnitude of a mismatch between parts.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of inspecting a part, the method comprising:
   manufacturing a standoff fixture specific to the part;
   coupling the standoff fixture to a laser measurement device;
   engaging the standoff fixture with the part; and
   actuating the laser measurement device to detect a geometric specification of a feature of the part;
   wherein:
   the standoff fixture comprises a plurality of legs;
   manufacturing the standoff fixture comprises manufacturing the plurality of legs of the standoff fixture specific to the feature of the part;
   the part comprises a rotor disk of a gas turbine engine;
   engaging the plurality of legs against the part comprises engaging a first leg of the plurality of legs against a web of the rotor disk; and
   engaging the plurality of legs against the part comprises engaging a second leg of the plurality of legs against a flange of the rotor disk.

2. The method of claim 1, wherein manufacturing the standoff fixture comprises manufacturing the standoff fixture specific to the feature of the part.

3. The method of claim 2, wherein the standoff fixture comprises three legs, wherein engaging the standoff fixture with the part comprises engaging the three legs against the part.

4. The method of claim 2, wherein the geometric specification of the feature comprises at least one of a radius, a mismatch, a chamfer angle, and a chamfer height.

5. The method of claim 1, wherein engaging the standoff fixture with the part comprises engaging the plurality of legs against the part.

6. The method of claim 1, wherein the feature of the part comprises a chamfer of the flange of the rotor disk.

7. The method of claim 6, wherein the geometric specification is an angle of the chamfer.

8. The method of claim 6, wherein the geometric specification is a dimension of the chamfer.

9. The method of claim 1, wherein manufacturing the standoff fixture comprises using an additive manufacturing process.

10. A standoff fixture for a laser measurement device, the standoff fixture comprising:
    an attachment portion configured to be coupled to the laser measurement device; and
    a plurality of legs extending from the attachment portion, wherein the plurality of legs are configured to engage with a part to be inspected;
    wherein the plurality of legs are specific to the part to be inspected; and
    wherein the standoff fixture comprises a planar surface extending from the attachment portion to a first leg of the plurality of legs such that the planar surface forms a portion of the attachment portion and a portion of the first leg.

11. The standoff fixture of claim 10, wherein each leg of the plurality of legs is oriented specific to the part to be inspected.

12. The standoff fixture of claim 10, wherein the plurality of legs comprise, respectively, a plurality of contact surfaces, wherein an orientation of each contact surface of the plurality of contact surfaces is specific to the part be inspected.

13. The standoff fixture of claim 10, wherein the plurality of legs comprises three legs.

14. The standoff fixture of claim 10, wherein the planar surface extends to a second leg of the plurality of legs such that the planar surface forms a portion of the second leg.

15. The standoff fixture of claim 14, wherein the plurality of legs comprises a third leg, wherein the third leg is oriented oblique to the planar surface.

16. An inspection assembly for inspecting a part, the inspection assembly comprising:
    a laser measurement device; and
    a standoff fixture detachably coupleable to the laser measurement device, wherein the standoff fixture comprises:
        an attachment portion for coupling to the laser measurement device; and
        a plurality of legs extending from the attachment portion;
    wherein the plurality of legs are configured to engage with the part;
    wherein the standoff fixture is specific to the part; and
    wherein the standoff fixture comprises a planar surface extending from the attachment portion to a first leg of the plurality of legs such that the planar surface forms a portion of the attachment portion and a portion of the first leg.

17. The inspection assembly of claim 16, wherein the plurality of legs are specific to the part.

* * * * *